United States Patent
Maruyama

(10) Patent No.: US 9,077,251 B2
(45) Date of Patent: Jul. 7, 2015

(54) CONTROL CIRCUIT OF A QUASI-RESONANCE SWITCHING POWER SUPPLY

(71) Applicant: FUJI ELECTRIC CO., LTD., Kawasaki-shi (JP)

(72) Inventor: Hiroshi Maruyama, Matsumoto (JP)

(73) Assignee: FUJI ELECTRIC CO., LTD. (JP)

(*) Notice: Subject to any disclaimer, the term of this patent is extended or adjusted under 35 U.S.C. 154(b) by 199 days.

(21) Appl. No.: 13/940,770

(22) Filed: Jul. 12, 2013

(65) Prior Publication Data

US 2014/0016365 A1 Jan. 16, 2014

(30) Foreign Application Priority Data

Jul. 13, 2012 (JP) ................... 2012-157564

(51) Int. Cl.
*H02M 3/335* (2006.01)
*H02M 1/00* (2007.01)

(52) U.S. Cl.
CPC .. *H02M 3/33507* (2013.01); *H02M 2001/0032* (2013.01); *H02M 2001/0058* (2013.01); *Y02B 70/1433* (2013.01); *Y02B 70/1491* (2013.01); *Y02B 70/16* (2013.01)

(58) Field of Classification Search
USPC ............. 363/21.02–21.03, 21.04–21.18
See application file for complete search history.

(56) References Cited

U.S. PATENT DOCUMENTS

| 7,795,851 | B2 | 9/2010 | Ye et al. | |
|---|---|---|---|---|
| 2003/0090254 | A1 | 5/2003 | Strijker | |
| 2008/0084713 | A1* | 4/2008 | Baurle et al. | 363/21.01 |
| 2010/0039835 | A1* | 2/2010 | Shimada | 363/21.12 |
| 2012/0113689 | A1* | 5/2012 | Chen et al. | 363/21.17 |
| 2013/0083572 | A1* | 4/2013 | Zhang et al. | 363/53 |

FOREIGN PATENT DOCUMENTS

| JP | 2005-503748 A | 2/2005 |
|---|---|---|
| JP | 2005-295787 A | 10/2005 |

* cited by examiner

*Primary Examiner* — Adolf Berhane
*Assistant Examiner* — Henry Lee, III
(74) *Attorney, Agent, or Firm* — Rossi, Kimms & McDowell LLP

(57) ABSTRACT

Aspects of the provide a control circuit of a quasi-resonant switching power supply in which the switching frequency can be adequately reduced under a light load condition. Some aspects include a control circuit of a quasi-resonant switching power supply that performs switching operation of a switching element based on a bottom detection signal. The control circuit of the switching power supply can include a dummy signal generating circuit that generates a dummy signal for replacing the bottom detection signal when the bottom detection becomes unable due to damping of a resonant waveform with decrease of switching frequency, or when the number of bottoms in the resonant waveform exceeds a predetermined times. The use of the dummy signal can increase the number of skips and thus, reduces the switching frequency.

11 Claims, 13 Drawing Sheets

CONTROL CIRCUIT OF A QUASI-RESONANCE SWITCHING POWER SUPPLY

BACKGROUND OF THE INVENTION

1. Field of the Invention

Embodiments of the invention relate to control circuits of quasi-resonant switching power supplies.

2. Description of the Related Art

In a quasi-resonance switching power supply, a switching frequency increases with decrease in the load. As a result, a switching loss in a power semiconductor device increases in a light load condition, diminishing a conversion efficiency. In a condition of a load below 50% of the rated load in particular, the conversion efficiency decreases remarkably. The increased loss causes overheating of the power semiconductor device.

To cope with this problem, a technique of bottom skip has been proposed to control steady increase in the operating frequency in the light load condition.

The bottom skip control technique utilizes a resonant waveform at a drain terminal of the power semiconductor device, a switching element, such as a MOSFET or an IGBT. In a heavy load condition, the switching element is turned ON at a time of the first bottom of the resonant waveform, while in a light load condition, the switching element is turned ON at a time of a bottom later than the first bottom, which is a bottom skip mode.

The number of bottom skips in this bottom skip control is determined larger under a lighter load condition to restrain the increase in the switching frequency under a light load condition.

This bottom skip control reduces the switching frequency in a light load condition. Since simple decrease in switching frequency lowers the output voltage of a power supply, a means is needed to stably maintain the output voltage of the power supply in which ON time ratio is kept by elongating the ON width of the switching element to compensate for the decrease in the switching frequency. However, if the ON width is elongated in the bottom skip control that detects the load condition based on the ON width of the semiconductor element, the judgment of the load condition is not appropriate and so the number of bottom skip would return back to the previous value in the next switching cycle, which results in disturbance in the switching frequency and occurrence of an acoustic noise.

A Japanese translation of PCT International Application No. 2005-503748 discloses a technique to prevent the disturbance in the switching frequency. The technique sets, by timers, two periods of time corresponding to an upper limit and a lower limit of switching frequency fhi and flo, respectively, as shown in FIG. 12. In order to conduct switching operation within the period of time determined by the upper and lower limit frequencies, the number of bottom skips is set in a logic circuit such as an up/down counter.

When the load becomes light and the switching frequency increases over the upper limit fhi, the number of bottom skips is increased; when the load becomes heavy and the switching frequency decreases below the lower limit flo, the number of bottom skips is decreased. The actual number of bottoms in the resonant waveform is counted by a separate counter. When the actual number of bottoms equals the predetermined number of bottom skips, the switching element is turned ON.

When the setting of the number of bottom skips is changed to a one skip larger number and the switching frequency has decreased, the range of switching frequencies is determined so that the new switching frequency is higher than the lower limit frequency flo. On the other hand, when the setting of the number of bottom skips is changed to a one skip smaller number and the switching frequency has increased, the range of switching frequencies is determined so that the new switching frequency is lower than the upper limit frequency fhi.

Such setting of the upper and lower limits of switching frequencies with hysteresis prevents the switching frequency from disturbance in the process of bottom skip change over and avoids the acoustic noise.

U.S. Pat. No. 7,795,851 discloses a PWM power supply with a fixed frequency in which, in an event of decreased load, the switching frequency is decreased by means of a control voltage corresponding to the load. This PWM power supply reduces a switching loss in a light load period and improves efficiency of the power supply.

From the viewpoint of improving the efficiency in a light load condition, it is desirable that the switching frequency is reduced to a frequency of about 25 kHz a little higher than an audible frequency when the load has decreased to a specified magnitude and, when the load decreases further to a frequency lower than the specified magnitude, the operation is preferably shifted to a burst operation, which is a known technique to conduct switching operation at a high switching frequency in the period following a period without switching.

In the quasi-resonant control as described above, the number of bottom skips is set in a logic circuit such as an up/down counter and the bottoms of the actual resonant voltage is countered, and when the counted number of bottoms equals the set number of bottom skips, the switching element is turned ON. To achieve the decrease in the frequency down to about 25 kHz, the bottoms need to be counted at least ten times considering the period of resonant generally in the range of from 1 μs to 3 μs.

However, resonant oscillation after complete release of energy from the transformer damps with proceeding of the oscillation. Thus, the detectable number of bottoms may decrease below ten times. If the necessary number of bottoms cannot be detected, the bottom skip control collapse and the frequency cannot be decreased to a desired value.

In the example of FIG. 13 with a resonant period of 1.2 μs, the resonant voltage Vds damps generating about 15 bottoms. But, stable detection of bottoms is possible only to about 12th bottom. So, the resonant oscillation period is actually 1.2 μs×12=14.4 μs. Adding an ON time 1 μs of the switching element, which is a period of zero volts of Vds, and a flyback period 2 μs in which the resonant voltage Vds is fixed at a high level, to the resonant oscillation period 14.4 μs, the total period amounts to 17.4 μs. Thus, the switching frequency in this example can decrease only to 57.5 kHz.

The amplitude and period of the resonant oscillation could be made large by increasing the capacitance of the resonant oscillation capacitor connected in parallel to the switching element. However, this necessarily increases the drain capacitance of the switching element and tends to increase the switching loss in one time of switching. Therefore, the efficiency in the light load condition is deteriorated. Thus, as is described above, there is a need in the art for an improved control circuit of a quasi-resonant switching power supply.

SUMMARY OF THE INVENTION

Embodiments of the invention address this and other needs. Embodiments of the present invention provide a control circuit of a quasi-resonant switching power supply in which the switching frequency is reduced to a desired extent in a light load condition.

A control circuit of a quasi-resonant switching power supply of an aspect of the present invention comprises a bottom detecting circuit for detecting a bottom of a resonant waveform and delivering a bottom detection signal and counts a number of the bottoms detected by the bottom detecting circuit to determine a switching period under a light load condition, wherein the control circuit counts a dummy signal in place of the bottom detection signal when the bottom detecting circuit becomes unable to detect a bottom, when a number of bottoms to be counted is a predetermined number, or when the number of bottoms detected by the bottom detecting circuit has reached a predetermined number.

A control circuit of a quasi-resonant switching power supply of another aspect of the present invention comprises: a bottom detecting circuit for detecting a bottom of a resonant waveform and delivering a bottom detection signal; a first counter for setting a number of bottom skips; a second counter for counting a number of bottoms; and a comparator for comparing a counted number of the first counter and a counted number of the second counter and for delivering a coincidence signal when the two counted numbers coincide with each other; and the control circuit performs switching operation of a switching element based on the bottom detection signal after the comparator has delivered the coincidence signal; wherein the control circuit comprises a dummy signal generating circuit for generating a dummy signal for replacing the bottom detection signal, and when the bottom detecting circuit becomes unable to detect a bottom due to damping of the resonant waveform, the second counter counts the dummy signal.

A control circuit of a quasi-resonant switching power supply of a still another aspect of the present invention comprises: a bottom detecting circuit for detecting a bottom of a resonant waveform and delivering a bottom detection signal; a first counter for setting a number of bottom skips; a second counter for counting a number of bottoms; and a comparator for comparing a counted number of the first counter and a counted number of the second counter and for delivering a coincidence signal when the two counted numbers coincide with each other; and the control circuit performs switching operation of a switching element based on the bottom detection signal after the comparator has delivered the coincidence signal; wherein the control circuit comprises a dummy signal generating circuit for generating a dummy signal for replacing the bottom detection signal, and when a setting value in the first counter exceeds a predetermined value or a number of bottoms in the resonant waveform exceeds a preset number of times, the second counter counts the dummy signal.

In some embodiments, the first counter is composed of an up/down counter, and the control circuit further comprises a timer for generating a first reference time and a timer for generating a second reference time longer than the first reference time, and when the switching period is shorter than the first reference time, the first counter executes up-counting, and when the switching period is longer than the second reference time, the first counter executes down-counting.

In some embodiments, a period of the dummy signal is set longer than a period of the resonant waveform.

In some embodiments, the timer for generating the second reference time varies a period of time from an end of the first reference time until an end of the second reference time according to a signal delivered from the first counter or a signal indicating use of the dummy signal.

DETAILED DESCRIPTION

Figure 1:
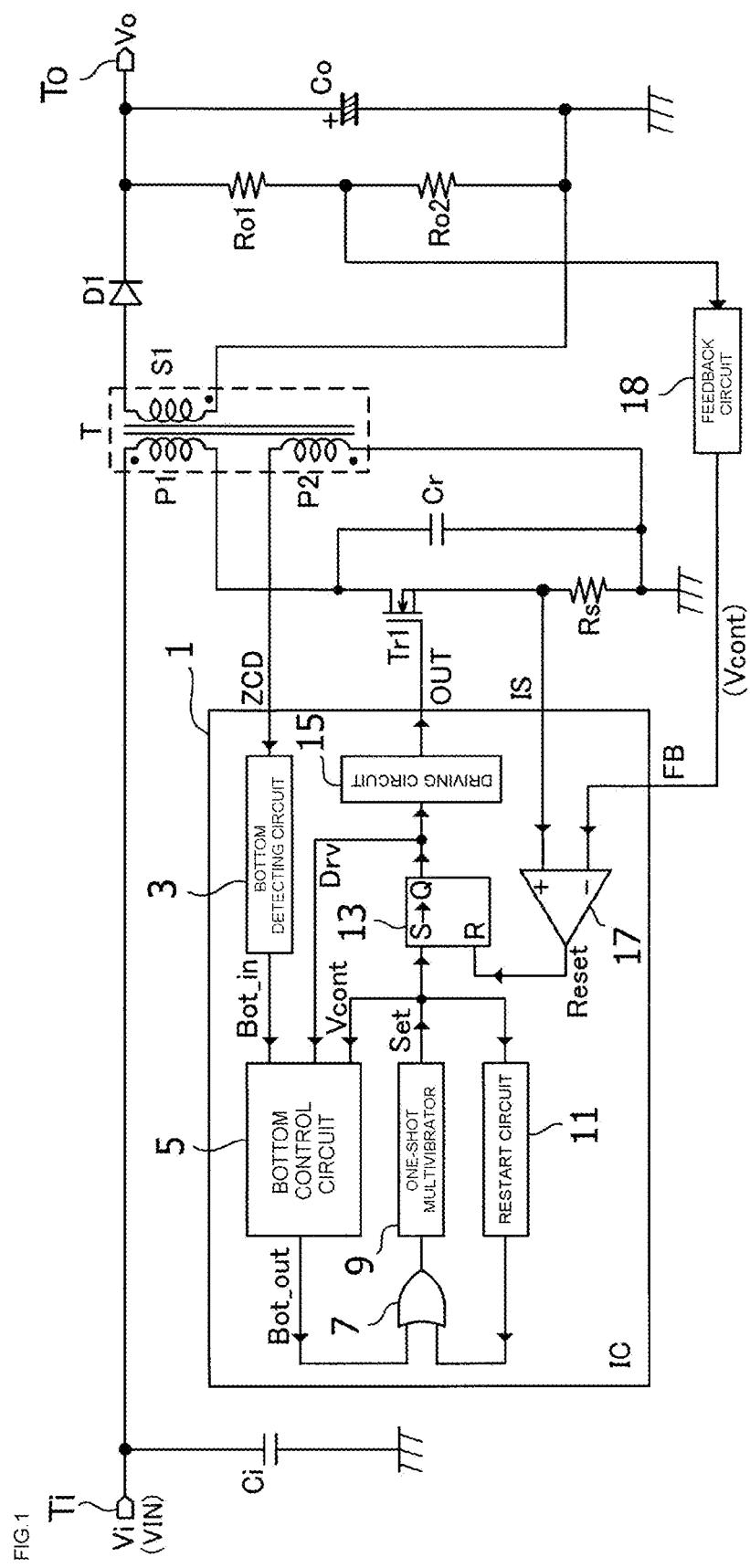
FIG. 1 is a circuit diagram of the whole construction of a quasi-resonant switching power supply including a control circuit according to an embodiment of the present invention.

FIG. 1 is a circuit diagram of the whole construction of a quasi-resonance switching power supply including a control circuit according to an embodiment of the present invention.

A transformer T in the switching power supply has a primary winding P1, a secondary winding S1, and an auxiliary winding P2. The primary winding P1 is connected to an input terminal Ti of the switching power supply at one end thereof and to a drain terminal of a switching element Tr1 of a metal oxide semiconductor field effect transistor (MOSFET) at the other end thereof. The secondary winding S1 is connected to an output terminal To of the switching power supply through a diode D1 at one end thereof and to the ground at the other end thereof. The auxiliary winding P2 is connected, at one end thereof, to an input terminal, a zero current detection (ZCD) terminal, of a switching control circuit 1, which will be described later, and connected, at the other end thereof, to the ground.

A smoothing capacitor Ci is connected between the input terminal Ti and the ground; another smoothing capacitor Co is connected between the output terminal To and the ground; and a resonant capacitor Cr is connected between the drain terminal of the switching element Tr1 and the ground. A voltage dividing circuit composed of voltage dividing resistors Ro1 and Ro2 is connected between the output terminal To and the ground; and a current sensing resistor Rs is connected between a source terminal of the switching element Tr1 and the ground.

The switching control circuit 1 comprises: a bottom detecting circuit 3, a bottom control circuit 5, an OR circuit 7, a one-shot multivibrator 9, a restart circuit 11, a flip-flop 13, a driving circuit 15, and a comparator 17. This switching control circuit 1 is constructed in an integrated circuit structure.

The bottom detecting circuit 3 detects a minimum of an output voltage of the auxiliary winding P2 given at the ZCD terminal and generates a Bot_in signal at a high (H) level. The specific construction and operation of the bottom detection circuit 3 as well as the bottom control circuit 5 will be described afterwards.

From the OR circuit 7 delivered are a Bot_out signal at an H level from the bottom control circuit 5 or a restart signal from the restart circuit 11. The Bot_out signal corresponds to the Bot_in signal mentioned above or a dummy signal described later. The restart circuit 11 delivers a restart signal using a timer circuit during a period of time, such as a startup period, in which Bot_out signal is not generated.

The one-shot multivibrator 9 is triggered by rising up of the Bot_out signal or the restart signal and generates a set signal of a pulse signal with a width of 300 ns, for example, which in turn sets a flip-flop 13 that is of set-preference. The flip-flop 13 delivers a Dry signal at an H level, and according to this Dry signal, the driving circuit 15 delivers a driving signal from an output terminal OUT of the control circuit 1 to turn ON the switching element Tr1.

As a consequence, the primary winding P1 of the transformer T, which is an inductor, starts to store energy. An IS terminal of the switching control circuit 1 receives a voltage across the current sensing resistor Rs connected in series to the switching element Tr1, the voltage corresponding to a current flowing through the switching element Tr1. The voltage received at the IS terminal is given to one input terminal (a "+" input terminal) of the comparator 17. A feedback circuit 18 receives a divided voltage of the output voltage Vo that is divided by the resistors Ro1 and Ro2.

The feedback circuit 18 operates a difference between the input voltage, which is the divided voltage, and a reference voltage (not shown in the figure), and delivers a feedback signal of the error signal through an FB terminal of the switching control circuit 1 to the other terminal (a "−" terminal) of the comparator 17. The feedback signal represents a magnitude of the load, and is a low value for a light load.

The comparator 17 delivers a reset signal Reset when the voltage across the resistor Rs exceeds the voltage of the feedback signal to reset the flip-flop 13. Upon reset of the flip-flop 13, the Dry signal becomes a low (L) level, turning OFF the switching element Tr1. As a result, the energy stored in the primary winding P1 of the transformer T is released to the secondary winding S1. In this energy releasing period, the switching element Tr1 is subjected to a constant voltage.

Figure 2:
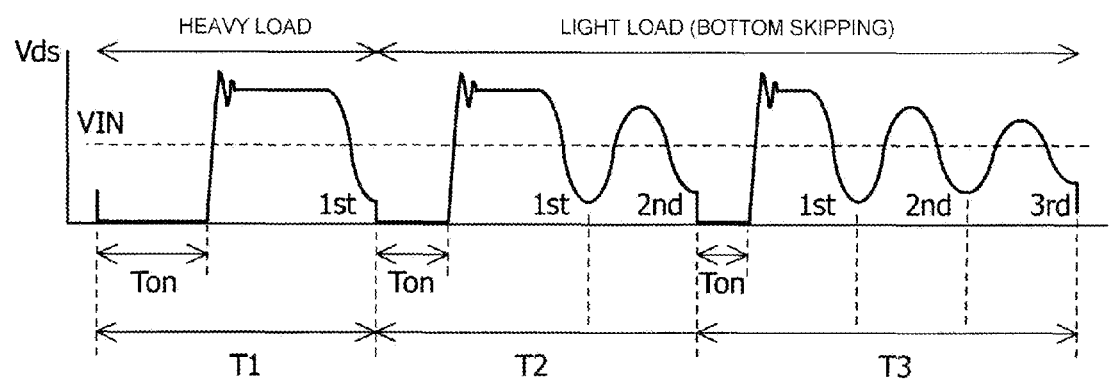
FIG. 2 shows a waveform of the drain-source voltage Vds of a switching element in resonant oscillation operation of a resonant oscillation circuit.

When the release of the energy stored in the primary winding P1 has finished, resonant oscillation begins in a resonant circuit composed of the resonant capacitor Cr and the primary winding P1. FIG. 2 shows an example of a waveform of the drain-source voltage Vds of the switching element Tr1 in the oscillation operation in the resonant circuit. This example of waveform is the one in bottom skip control.

The auxiliary winding P2 of the transformer T generates a voltage similar to the resonant oscillation voltage in the resonant circuit and the generated voltage is delivered to the bottom detecting circuit 3 through the ZCD terminal. The voltage generated across the auxiliary winding P2 varies above and below the zero volt level. The zero volt level of the voltage developing across the auxiliary winding P2 corresponds to the input voltage VIN in the primary side indicated in FIG. 2.

Figure 6:
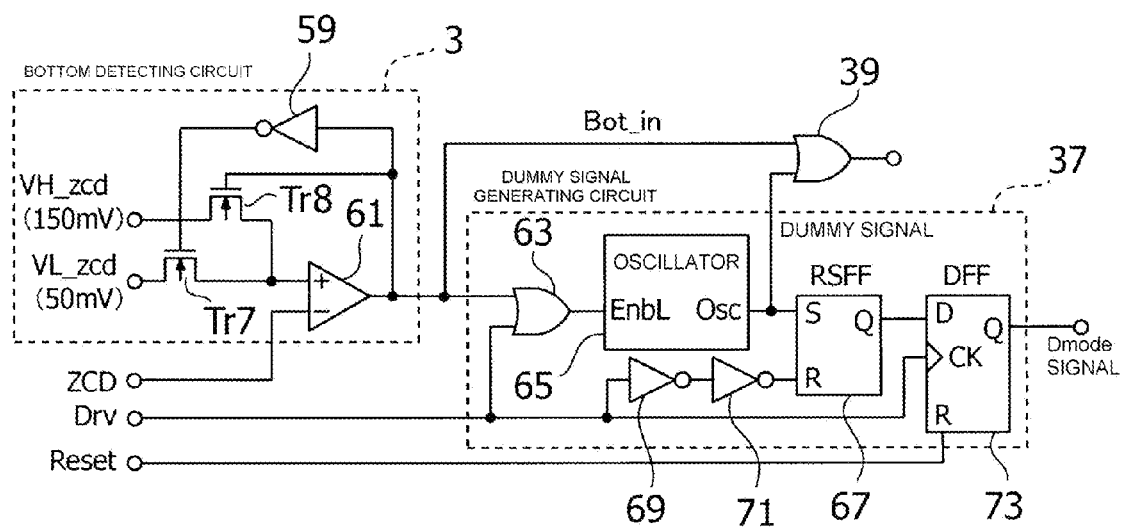
FIG. 6 is a circuit diagram of an example of construction of a bottom detecting circuit and an example of construction of a dummy signal generating circuit.

FIG. 6 shows an example of construction of the bottom detecting circuit 3. The bottom detecting circuit 3 has a comparator 61 that compares an input voltage given through the ZCD terminal with a reference voltage VL_zcd, for example 50 mV, or a reference voltage VH_zcd, for example 150 mV. The reference voltages VL_zcd and VH_zcd are delivered through a transistor Tr7 and a transistor Tr8, respectively, to the comparator 61. The transistor Tr7 is turned ON/OFF by an output signal of the comparator 61 after inverted through the inverter 59, and the transistor Tr8 is turned ON/OFF by the output signal of the comparator 61.

The comparator 61 delivers a Bot_in signal at an H level indicating bottom detection for the input voltage from the ZCD terminal when the input voltage has decreased below the reference voltage VL_zcd, which is set at nearly zero volts. Then at the moment the input voltage has exceeded the reference voltage VH_zcd, the comparator 61 delivers a Bot_in signal at an L level. Thus, the bottom detecting circuit 3 functions as a hysteresis comparator and avoids malfunctions due to noises.

Figure 13:
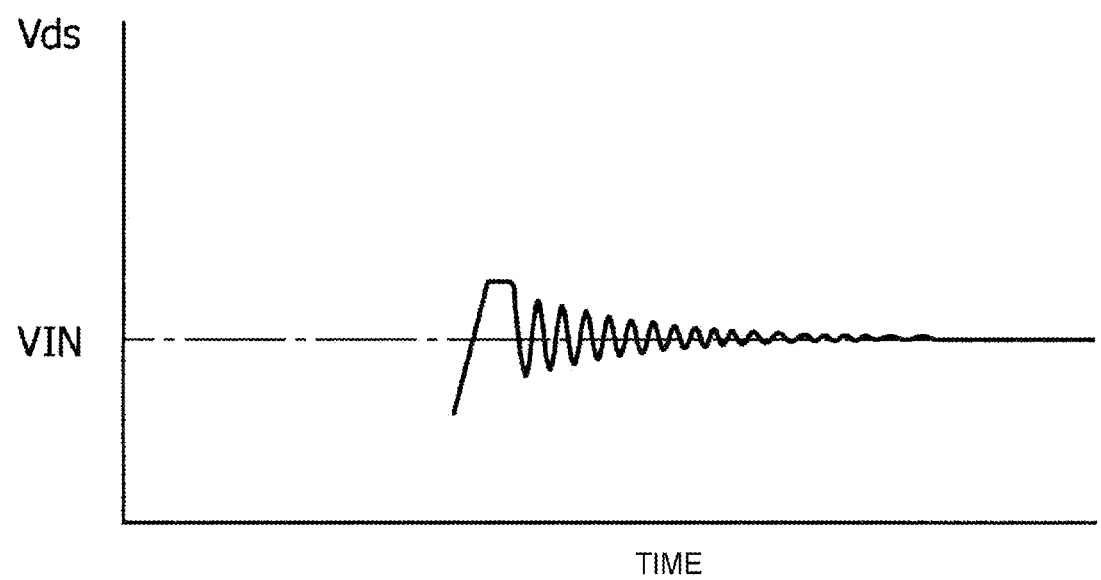
FIG. 13 shows an example of waveform showing damping characteristic of resonant oscillating voltage.

With the progress of resonant oscillation increasing the number of bottoms, the amplitude of the resonant oscillation waveform damps as shown in FIG. 13. When the top of the resonant oscillation waveform becomes lower than the reference voltage VH_zcd, which is about 150 mV, the bottom detecting circuit 3 stops the bottom detecting operation.

As described above, the bottom detecting circuit 3 detects a bottom of the input voltage and delivers a Bot_in signal at an H level, which is a pulse signal with a pulse width of 200 ns, to the bottom control circuit 5 as shown in FIG. 1.

The Bot_in signal is actually generated at a timing of 90 degrees leading phase angle from the bottom of the resonant oscillation shown in FIG. 2. Accordingly, a delay circuit (not shown in the figure) composed of a capacitor and a resistor, for example, is provided connecting to the ZCD terminal to delay the input voltage to the ZCD terminal. The delay circuit matches the timing of a bottom in the resonant oscillation waveform with the timing of delivery of the Bot_in signal, which is coincide with the timing of turning ON of the switching element Tr1.

The bottom control circuit 5 delivers a Bot_out signal at an H level based on the Bot_in signal at an H level given by the bottom detecting circuit 3. The bottom control circuit 5 delivers a first Bot_in signal as a Bot_out signal in a heavy load condition, and a second and later Bot_in signal as a Bot_out signal in a light load condition, which is a bottom skip mode. In certain cases described later, a dummy signal is generated and, corresponding to situations, a Bot_out signal is also delivered based on this dummy signal.

Upon delivery of a Bot_out signal at an H level from the bottom control circuit 5, the switching element Tr1 turns ON, as described previously.

If a Bot_out signal is not delivered from the bottom control circuit 5, the restart circuit 11 delivers a signal to a one-shot multivibrator 9 after passing a period of time about 30 μs set by a timer to resume switching operation.

Figure 3:
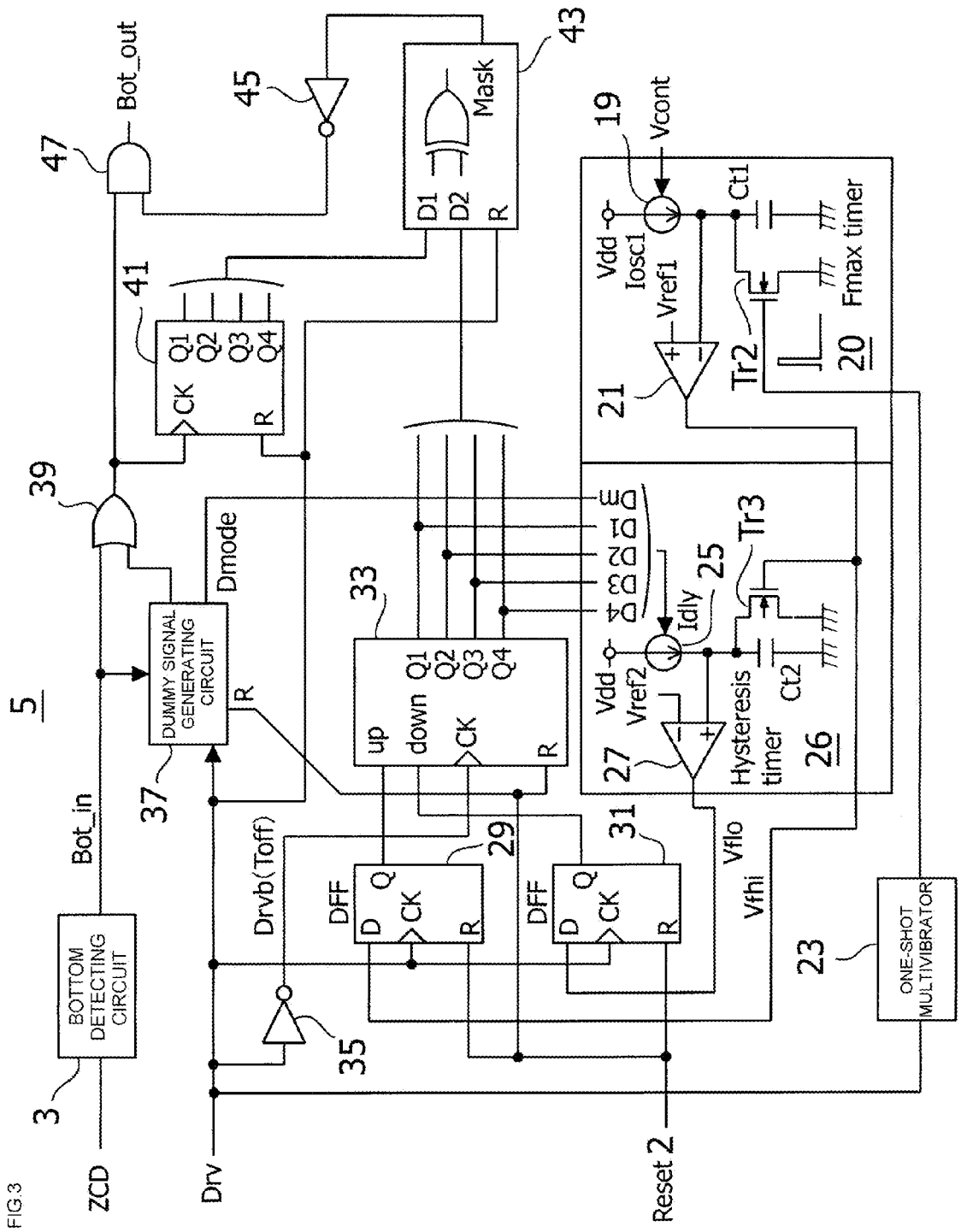
FIG. 3 is a circuit diagram of an example of construction of a bottom control circuit.

The following describes the bottom control circuit 5 more in detail with reference to FIG. 3. The signal Reset2 indicated in FIG. 3 is a reset signal given at the start of the switching power supply device.

The bottom control circuit 5 determines an upper limit and a lower limit of a switching frequency based on a voltage Vcont. The voltage Vcont, a control signal, is given to a variable constant-current source 19 and changes the magnitude of a constant current Iosc1 for charging a timing capacitor Ct1. A magnitude of the Iosc1 is smaller for lower Vcont voltage.

This embodiment uses a feedback signal given to the FB terminal indicated in FIG. 1 for the Vcont voltage. As described earlier, the feedback signal represents the magnitude of the load and is a lower voltage under a lighter load condition.

Figure 4:
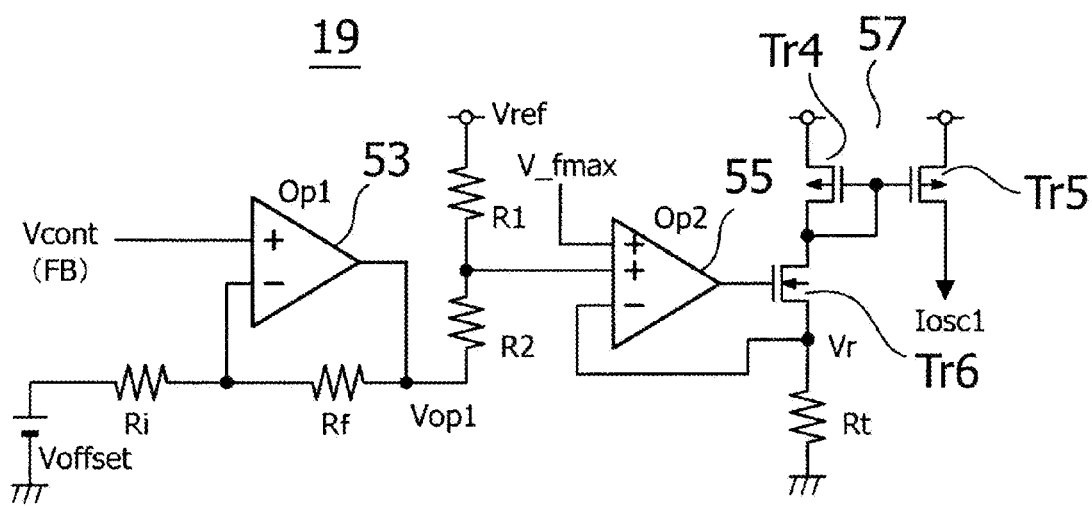
FIG. 4 is a circuit diagram of an example of construction of a variable constant-current source.

FIG. 4 shows an example of construction of a variable constant-current source 19. Describing from the last stage to the first stage, the variable constant-current source 19 is provided with a constant current circuit 57 composed of transistors Tr4 and Tr5 forming a current mirror circuit. The reference current of the constant current circuit 57 is determined by controlling the voltage Vr across a current detecting resistor Rt at a constant voltage value by means of an operational amplifier 55 and a transistor Tr6 that are buffer-connected.

The operational amplifier 55 has two + input terminals and receives in preference a lower voltage of the two input voltages given to the two input terminals. Under normal load conditions, a voltage V_fmax, for example 2.5 V, corresponding to the maximum switching frequency is given in preference to the first + input terminal. The constant current delivered from the constant current circuit 57 is Iosc1=2.5 V/Rt in this case.

Another operational amplifier 53, together with the resistors R1, R2, Rf and Ri, and the voltage source Voffset composes a non-inverting amplifier circuit for the input voltage Vcont. Receiving the voltage Vcont at the + input terminal, the operational amplifier 53 delivers an output voltage Vop1=(Vcont−Voffset)×(Ri+Rf)/Ri. Here, Voffset is an offset voltage, Ri is an input resistance, and Rf is a feedback resistance. The operational amplifier 53 cannot deliver a negative voltage and so the lower limit value of the output voltage Vop1 is zero volts or the ground voltage.

Resistors R1 and R2 divide the difference voltage between a stabilized reference voltage Vref, 5 V for example, and the output voltage Vop1 of the operational amplifier 53. The divided voltage, more strictly, the sum of the divided difference voltage and the voltage Vop1, is given to the second + input terminal of the operational amplifier 55.

Because the divided voltage is given to the second + input terminal of the operational amplifier 55, the second + input terminal receives a voltage Vref×R2/(R1+R2) even in the case of minimum value of zero volts of the output voltage Vop1 of the operational amplifier 53.

This embodiment is designed to set a divided voltage of 2.5 V for the input Vcont voltage at the point to start reduction of the switching frequency. As a result, with input of a Vcont voltage corresponding to a lighter load, a constant current Iosc1 is set to determine a lower switching frequency than the maximum switching frequency.

Figure 5:
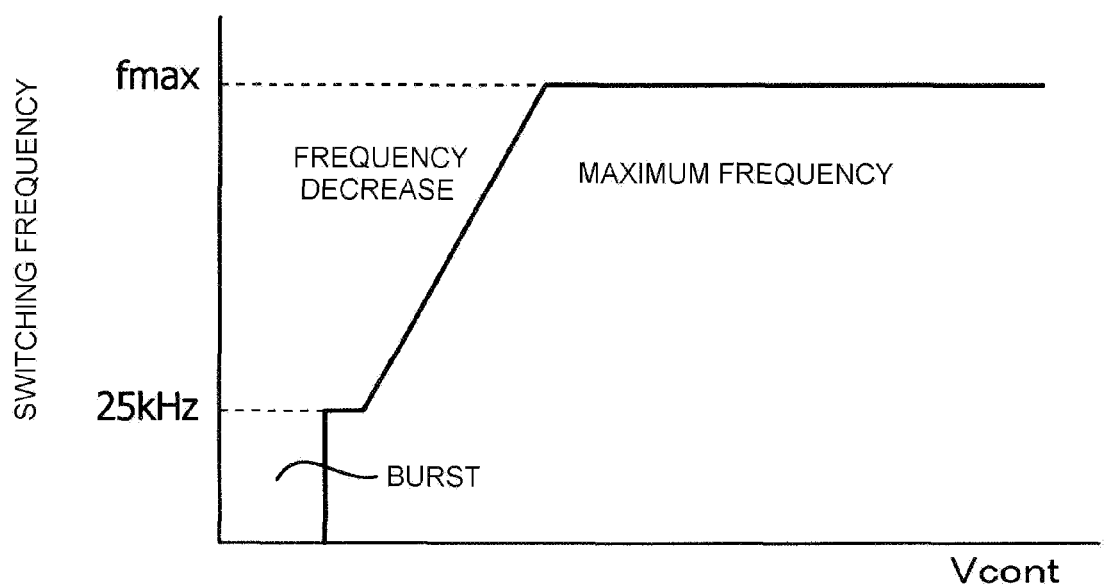
FIG. 5 shows change of switching frequencies in the dependence on the control voltage corresponding to the load.

The constant current Iosc1 is varied with the Vcont voltage until reaching the current value corresponding to the minimum switching frequency, for example 25 kHz. Thus, the characteristic of switching frequency variation like the one as shown in FIG. 5 results.

Figure 8:
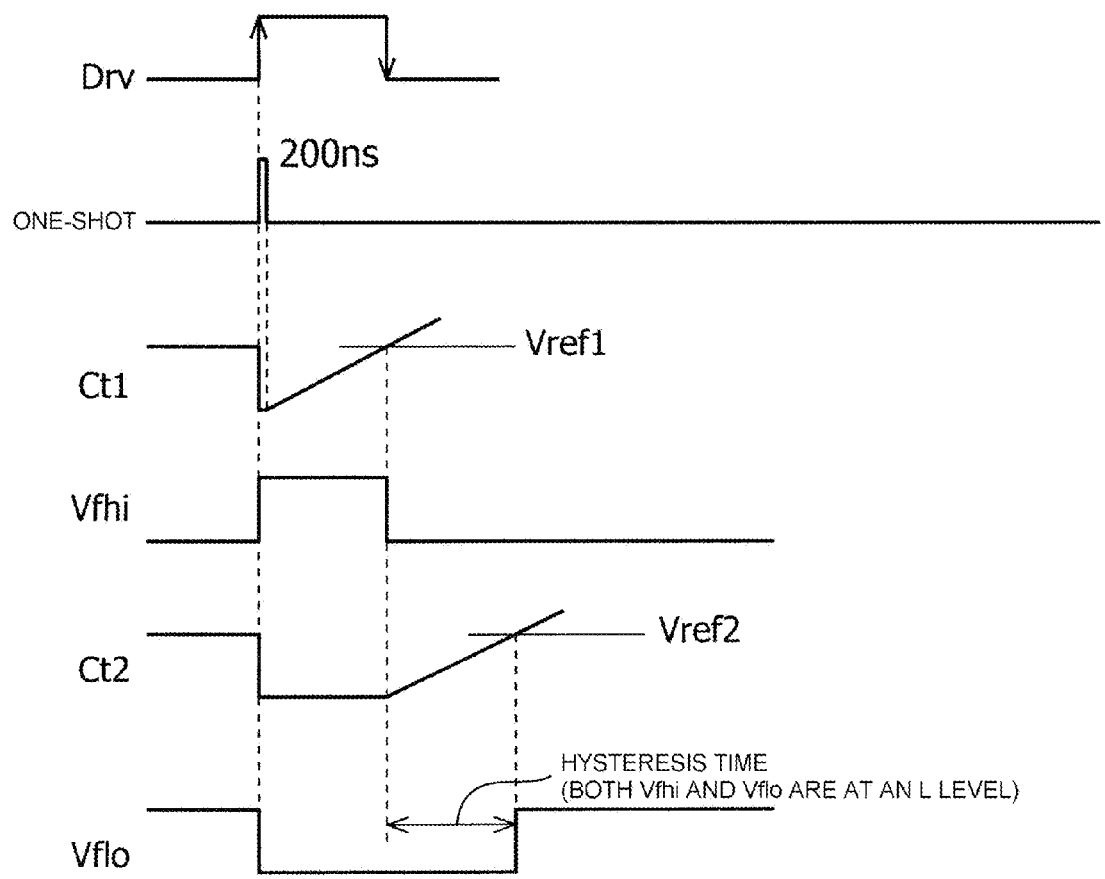
FIG. 8 shows waveforms illustrating the operation of the bottom control circuit.

The one-shot multivibrator 23 in FIG. 3 delivers a one-shot pulse signal with a pulse width of about 200 ns as shown in FIG. 8 at the rising up moment of the Dry signal, at which the switching element Tr1 turns ON. This one-shot pulse signal turns ON a transistor Tr2 connected in parallel to a timing capacitor Ct1. As a result, the timing capacitor Ct1 discharges, resetting the voltage across the capacitor to zero volts.

After that, the timing capacitor Ct1 is charged with the constant current Iosc1 supplied by the variable constant-current source 19. Thus, the voltage across the timing capacitor Ct1 rises with a ramp rate corresponding to the charging current Iosc1.

A comparator 21 compares the voltage across the timing capacitor Ct1 with a reference voltage Vref1. Until the capacitor terminal voltage reaches the reference voltage Vref1, or before passing a period of time corresponding to the upper limit switching frequency, the comparator 21 delivers a high level signal Vfhi. The period of time in which the signal Vfhi at an H level is being delivered is referred to as a first reference time. After passing the period of time corresponding to the upper limit frequency, a signal Vfhi at an L level is delivered.

Thus, a timer 20 is constructed to produce a time, the first reference time, which corresponds to the upper limit switching frequency. The timer 20 is composed of the variable constant-current source 19, the timing capacitor Ct1, the comparator 21, and the transistor Tr2.

The other timing capacitor Ct2 is connected in parallel to the transistor Tr3. The transistor Tr3 is in an ON state during the comparator 21 is delivering the Vfhi at an H level to fix the voltage at the terminal of the timing capacitor Ct2 at zero volts.

After passing the first reference time corresponding to the period of upper limit frequency and the comparator 21 delivers the Vfhi signal at an L level, the transistor Tr3 turns OFF. As a consequence, the timing capacitor Ct2 starts to be charged with a constant current Idly from a variable constant current source 25 as shown in FIG. 8. A comparator 27 compares a terminal voltage of the timing capacitor Ct2, the voltage being rising with progress of charging, with a reference voltage Vref2. When the terminal voltage reaches the reference voltage Vref2, the comparator 27 delivers a Vflo signal at an H level.

A hysteresis width, or a hysteresis time, for determining a switching period is the charging period of time until the terminal voltage of the timing capacitor Ct2 reaches the reference voltage Vref2, as indicated in FIG. 8. A second reference time is defined as the sum of the first reference time and the hysteresis time.

The hysteresis width is determined estimating such a period of time in which the number of skips that has changed over does not return to the previous value in the next switching cycle.

When an estimated resonant period is from 1 µs to 1.5 µs, for example, the hysteresis width can be set at 2 µs. Even though the switching period is elongated by the time of one period of the resonant period, the switching period does not overlap with the period of an H level of the Vflo signal. Therefore, the bottom skip does not return to the previous mode.

Thus, a hysteresis timer 26 to determine a hysteresis width is composed of the variable constant-current source 25, the timing capacitor Ct2, the comparator 27, and the transistor Tr3.

Consequently, when the switching period is shorter than the first reference time, the Vfhi signal is at an H level, and when the switching period is longer than the second reference time, the Vflo signal is at an H level.

A D flip-flop (hereinafter abbreviated to DFF) 29 and a DFF 31 read-in the Vfhi signal and the Vflo signal, respectively, at the last moment (or just before resetting) of the previous switching period detecting a rising up edge of the Dry signal, which coincides with the timing of turning ON of the switching element Tr1.

In the case the read-in Vfhi signal is at an H level, the DFF 29 delivers a count-up signal at an H level to an up/down counter 33 at the next stage; and in the case the read-in Vflo signal is at an H level, the DFF 31 delivers a count-down signal at an H level to the up/down counter 33.

The up/down counter 33 stores a set value of the number of bottom skips until the switching element Tr1 turns ON. The up/down counter 33 receives, at the clock input terminal, a Drvb signal that is the Dry signal inverted by an inverter 35, and operates as described below at the timing of rising up edge of the Drvb signal, which is the falling down edge of the Dry signal and thus, the timing of turning OFF of the switching element Tr1.

If the count-up signal is at an H level, the up/down counter 33 counts up, or increases, the number of bottom skips by one skip; and if the count-down signal is at an H level, the counter counts down, or decreases, the number of bottom skips by one skip. If both the count-up signal and the count-down signal are at an L level, the counter remains in the previous state.

Meanwhile, the control method of counting the number of bottom skips would fail to detect necessary number of bottoms with an ordinary bottom detection circuit because the resonant oscillation waveform damps in a low switching frequency as described previously with reference to FIG. 13.

A dummy signal generating circuit 37 is provided in order to cope with this situation. The dummy signal generating circuit 37 as shown in FIG. 6 comprises an oscillator 65, a reset-set flip-flop (hereinafter abbreviated to RSFF) 67, and a DFF 73. When both the Bot_in signal from the bottom detection circuit 3 and the Dry signal are at an L level, an OR circuit 63 gives an L level signal to the EnbL terminal of the oscillator 65 connected to the OR circuit 63.

Figure 7:
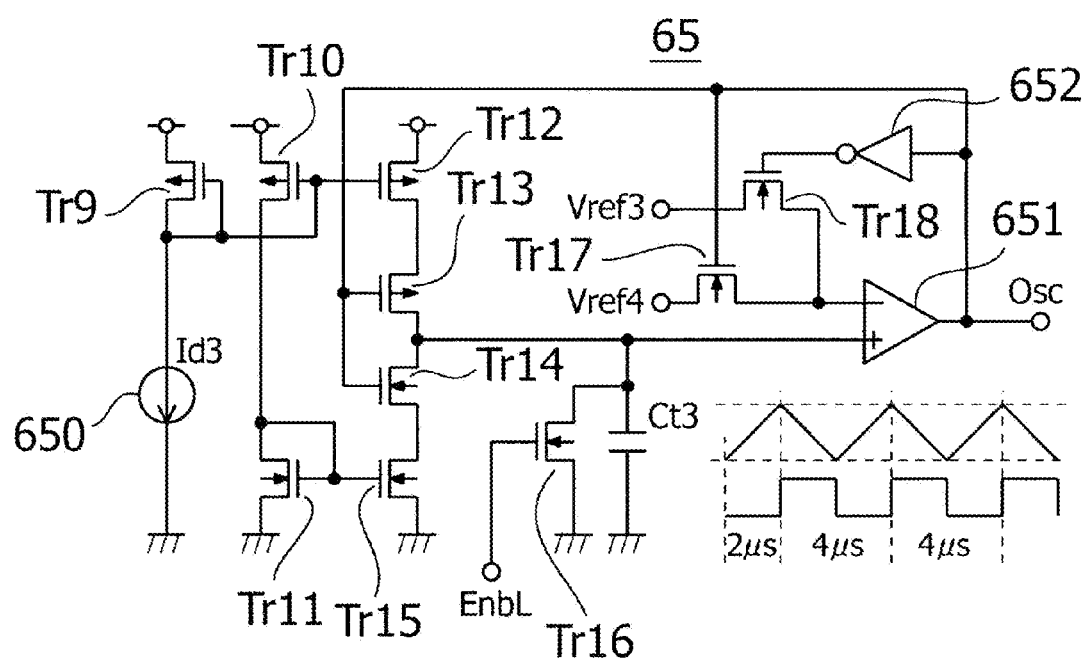
FIG. 7 is a circuit diagram of an example of construction of an oscillator in the dummy signal generating circuit.

The oscillator 65 has a construction as shown in FIG. 7. In this oscillator 65, a constant current Id3 determined by a constant current source 650 flows through a transistor Tr10 and a transistor Tr11 with a current mirror circuit having an input terminal of the drain of a transistor Tr9. The constant current Id3 is actually a current obtained by amplifying the current Id3 corresponding to the mirror factor of the current mirror circuit and is only a current proportional to the current Id3. But a wording "a constant current Id3" is used for simplicity, which is valid hereinafter. Of the transistors Tr12 through Tr15 connected in series, the transistor Tr12 composes a current mirror circuit in combination with the transistor Tr10, and the transistor Tr15 composes another current mirror circuit in combination with the transistor Tr11.

When the EnbL terminal changes to an H level, the transistor Tr16 turns ON, which in turn discharges a capacitor Ct3 to fix the voltage at the terminal thereof to zero volts. As this zero voltage changes the voltage at the output terminal of the comparator 651 to an L level, the transistor Tr13 turns ON and a transistor Tr18 also turns ON through an inverter 652. At this moment, the transistor Tr14 and a transistor Tr17 turn OFF. Upon turning ON of the transistor Tr18, a reference voltage Vref3 is given to the "−" terminal of the comparator 651.

After that, when the EnbL terminal changes to an L level, the capacitor Ct3 begins to be charged with the current Id3 through the transistors Tr12 and Tr13, and the terminal voltage of the capacitor Ct3 increases.

The comparator 651 receives the terminal voltage of the capacitor Ct3 at a "+" terminal thereof and delivers an H level signal when the terminal voltage of the capacitor Ct3 reaches a reference voltage Vref3.

With the change of the voltage at the output terminal of the comparator 651 to an H level, the transistor 14 turns ON and the transistor 13 turns OFF. As a result, the capacitor Ct3 begins to be discharged with the constant current Id3 through the transistors Tr14 and Tr15, and the terminal voltage of the capacitor Ct3 decreases. The change of the voltage at the output terminal of the comparator 651 to an H level also turns the transistor Tr17 ON and turns the transistor Tr18 OFF. As a result, the comparator 651, which is an operational amplifier, receives at a "−" terminal thereof a reference voltage Vref4, 0.1 V for example, that is lower than the reference voltage Vref3. When the terminal voltage of the capacitor Ct3 decreases to the reference voltage Vref4, the voltage at the output terminal of the operational amplifier 651 changes to an L level.

During the period at an L level of the EnbL terminal, the above described process is repeated.

FIG. 7 includes inserted waveforms of the terminal voltage of the capacitor Ct3 and an oscillation signal delivered from an output terminal Osc of the oscillator 65, the latter signal being a dummy signal described later. As shown by the inserted waveforms, the oscillator 65 delivers a first H level signal after passing 2 μs from change of the voltage at the EnbL terminal to an L level. After that the H level signals are delivered after every 4 μs period.

When the Bot_in signal or the Dry signal changes to an H level, which means the voltage at the EnbL terminal changes to an H level, the transistor Tr16 indicated in FIG. 7 turns ON and the capacitor Ct3 discharges to fix the terminal voltage thereof to zero volts.

The periods of time for charging and discharging the capacitor Ct3 with the constant current Id3 are each 2 μs and longer than the resonant period. Thus, a timer is composed, to determine a period of time longer than the resonant oscillation period, of the capacitor Ct3, the current source for the constant current Id3, and the comparator 651.

The dummy signal formed by the charging and discharging processes of the capacitor Ct3 is delivered when the voltage at the EnbL terminal changes to an L level, that is, when the Dry signal and the bottom detection signal Bot_in signal change to an L level.

A dummy signal at an H level delivered from the output terminal Osc of the oscillator 65 sets an RSFF 67 indicated in FIG. 6 to change the voltage at the Q output terminal thereof to an H level. A DFF 73 reads-in the H level signal at a rising-up timing of the Dry signal and delivers a Dmode signal at an H level from the Q terminal of the DFF 73. After that, the RSFF 67 is reset by the Dry signal that is delivered through a delay circuit composed of inverters 69 and 71 connected in tandem.

The Dmode signal is at an H level under a light load condition in which a dummy signal is delivered from the Osc terminal of the oscillator 65. When the load increases and the switching element Tr1 turns ON without operation of the dummy signal generating circuit 37, the Dmode signal returns to an L level.

As shown in FIG. 3, the Bot_in signal at an H level delivered from the bottom detecting circuit 3 or the dummy signal at an H level delivered from the dummy signal generating circuit 37 is given to the clock input terminal CK of the counter 41 through the OR circuit 39.

The counter 41 is reset at the timing of rising up of the Dry signal, which is a timing of turning ON of the switching element Tr1. After that, the counter 41 counts signals delivered through the OR circuit 39.

The comparator 43 is connected to the output terminals of two counters 33 and 41. The comparator 43 is reset at the timing of turning OFF of the switching element Tr1 and delivers a Mask signal at an H level. The Mask signal is inverted by an inverter 45 and given to an AND circuit 47 and thus, prohibits the Bot_in signal at an H level or the dummy signal at an H level delivered by the OR circuit 39 from passing through the AND circuit 47.

The comparator 43 compares the output values of the counter 33 and the counter 41, or compares the number of bottoms set in the counter 33 and the number of bottoms detected by the counter 41. If the two numbers of bottoms coincide with each other, a mask signal inverted to an L level is delivered. The AND circuit 47 allows the Bot_in signal at an H level and the dummy signal at an H level passing through the AND circuit 47 during the Mask signal remains in an L level. The signals passing through the AND circuit 47 is delivered as a Bot_out signal, which acts as a turn ON trigger signal in the next cycle.

The counter 41 proceeds to count using a dummy signal at an H level indicating a pseudo-bottom when a Bot_in signal at an H level becomes undelivered due to the damping of the actual resonant oscillation. Consequently, the switching frequency can be adequately decreased. The following describes in detail about operation to decrease the switching frequency by means of the dummy signal.

Description is first made for the case without using the dummy signal. Bottom skip operation under a light load condition in this case adds a resonant period, ordinarily 1 to 2 μs, to the basic period of operation as shown in FIG. 2. Thus, the switching frequency decreases. However, with growth of the switching period, the rate of frequency reduction per one additional bottom skip decreases.

Figure 9:
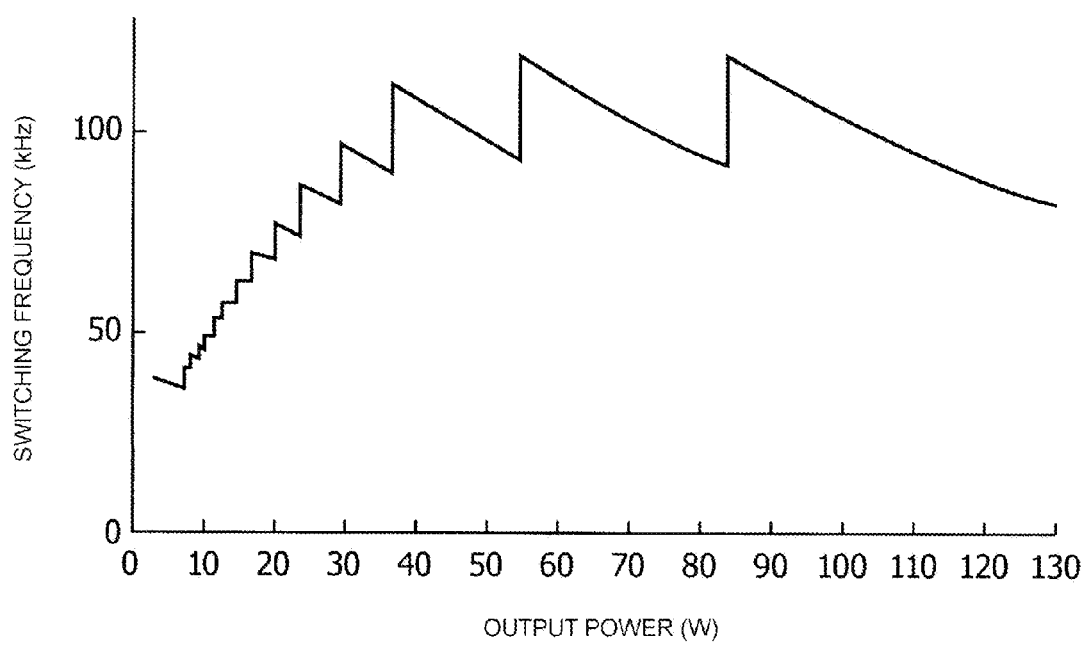
FIG. 9 is a graph showing an example of relationship between the output power and the switching frequency in a case without using a dummy signal.

FIG. 9 shows an example of variation of switching frequencies when the number of bottom skips changes from zero to 15 under the condition of a resonant period of 1.5 μs. The abscissa is output power representing a magnitude of the load. When the number of bottom skips increases to ten, the switching frequency is about 50 kHz, and corresponding period is about 20 μs. If the number of skips increases one skip, the switching frequency decreases from 50 kHz to merely 46.5 kHz, and corresponding period only increases from 20 μs to 21.5 μs. This shows that the rate of frequency reduction per one additional bottom skip decreases. The maximum number of bottom skips of 15 in the example of FIG. 9 reduces the switching frequency merely down to 37 kHz.

Figure 10:
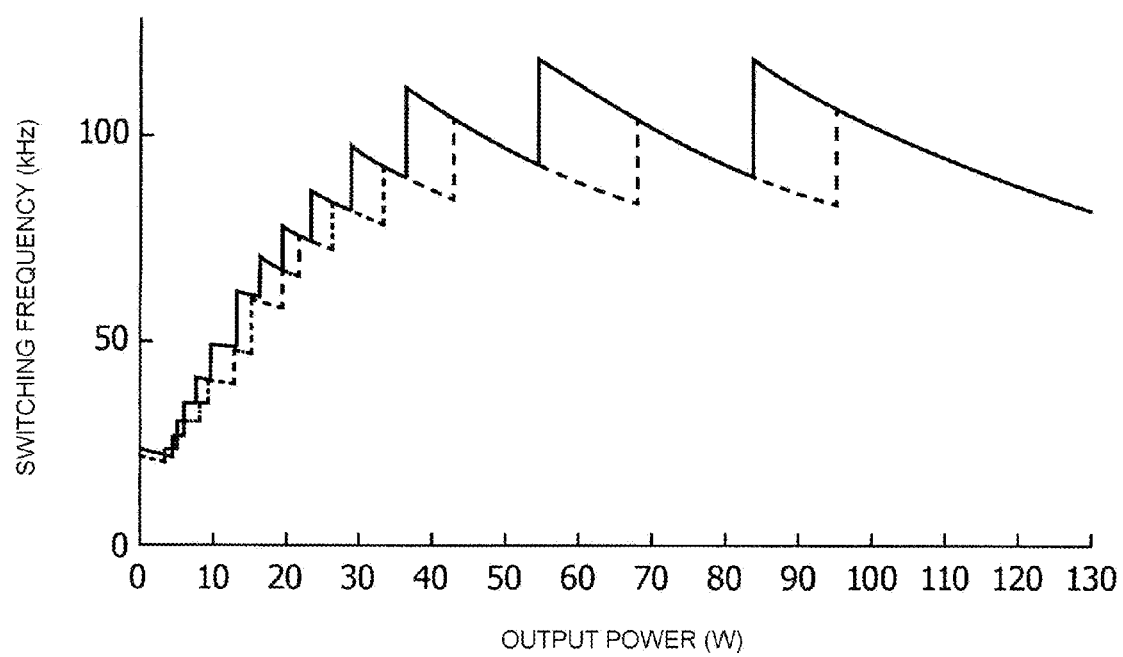
FIG. 10 is a graph showing an example of relationship between the output power and the switching frequency in a case using a dummy signal.

In the embodiment of the present invention that has the dummy signal generating circuit 37 on the other hand, the switching frequency can be adequately reduced using the dummy signal as shown in FIG. 10 because the period of the dummy signal is set longer than the resonant period of 1 to 2 μs.

In the example of FIG. 10, the turning ON is delayed based on the actual resonant period of 1.5 μs until the seventh bottom, and then the turning ON is delayed using the dummy signal. In this example of operation, the first dummy signal, which corresponds to the eighth bottom signal in overall bottoms, is delayed by 2 μs from the seventh bottom, and the dummy signals corresponding to the bottom signals thereafter are delayed by 4 μs. As a result, this example can reduce the switching frequency down to about 20 kHz for the maximum number of skips of 15.

In the case the load decreases from 130 Was shown in FIG. 10, if the switching period is shorter than the first reference time corresponding to the period of the upper limit switching frequency that is set by the timer 20, which is an Fmax timer, indicated in FIG. 3 based on the voltage Vcont at the FB terminal at that moment, the up/down counter 33 executes up-counting to increase the number of bottom skips resulting in switching frequency reduction as shown by the solid line.

On the contrary, in the case the load increases, the lower limit switching frequency is set based on the second reference time, corresponding to the period of the lower limit frequency. The second reference time is set by adding the time set in the timer 26, which is a hysteresis timer, indicated in FIG. 3 to the period of the upper limit switching frequency. If the switching period is longer than the second reference time, the up/down counter 33 executes down-counting to reduce the number of bottom skips. Thus, the switching frequency increases as shown by the dotted line in FIG. 10.

In this process, the hysteresis timer 26 receives signals D1 through D4 delivered from the output terminals Q1 through Q4 of the up/down counter 33 for setting the number of bottom skips, or a signal Dm from a Dmode terminal indicating whether a dummy signal is effective or not. These signals D1 through D4 and the signal Dmode are control signals to be given to the variable constant-current source 25 and changes a constant current Idly for charging a capacitor Ct2. Thus, a hysteresis width is determined according to the bottom skip situation.

The width of the hysteresis, when it is excessively narrow, brings about instability in changeover process of the bottom skip, generating hunting phenomenon on the one hand. When the width of the hysteresis is set too wide on the other hand, the difference increases between the switching frequency for a decreasing load and the switching frequency for an increasing load, resulting in the increased range of scattering of operation frequencies, which may cause increased scattering of efficiencies.

However, in the embodiment of the invention as described above, the variable constant-current source 25 is controlled using the signals D1 through D4 and the signal Dm. Therefore, the hysteresis width is optimized corresponding to the situation of the bottom skip, eliminating the above problem.

When the dummy signal is in effect, the variation of the resonant period caused by changeover of the number of bottom skips is large, and so, the hysteresis width needs to be set long for stable operation. Thus, the hysteresis width is set based on the following relationship.

Hysteresis width=capacitance of the capacitor $Ct2 \times$ reference voltage $Vref2$/charging current Idly The optimum hysteresis width is determined by decoding the digital signals D1 through D4 and the signal Dm and changing the values of the capacitance of the capacitor Ct2, the reference voltage Vref2, and the charging current Idly.

When the counter 41 starts to count the dummy signals, the turning ON timing of the switching element Tr1 shifts from the timing of the bottom of the resonant waveform. When the resonant waveform is damping, however, the drain voltage of the switching element Tr1 is approximately a constant voltage nearly equal to VIN of the input voltage Vi indicated in FIG. 1 and FIG. 2. Thus, the shift of the turn ON timing of the switching element Tr1 does not bring about so great change in the switching loss.

Rather than the small change of the switching loss due to the shift of turning ON timing, much greater advantage is obtained in the switching loss owing to reduction in the number of switching actions of the switching element Tr1.

Figure 11:
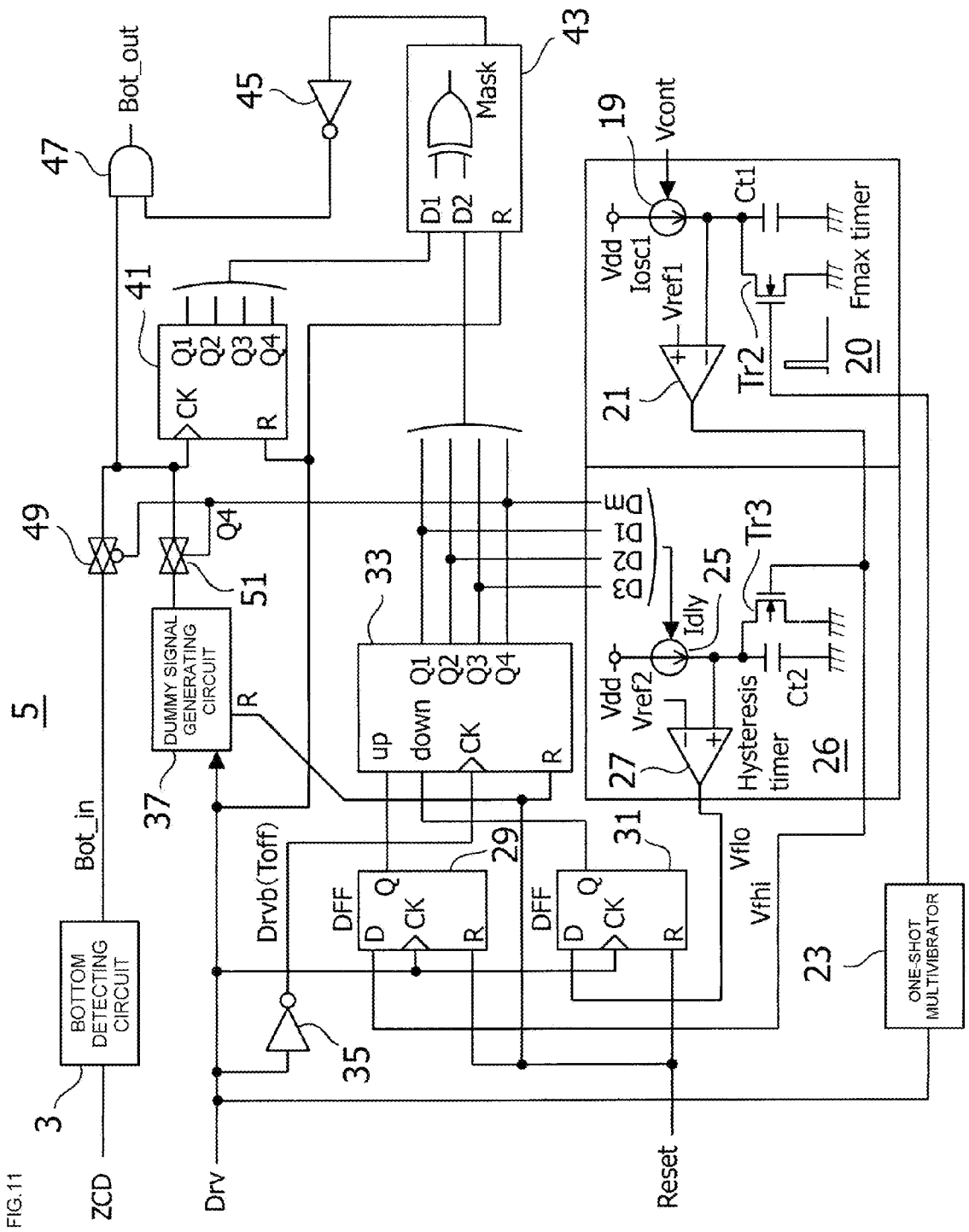
FIG. 11 is a circuit diagram of another example of construction of a bottom control circuit.
Figure 12:
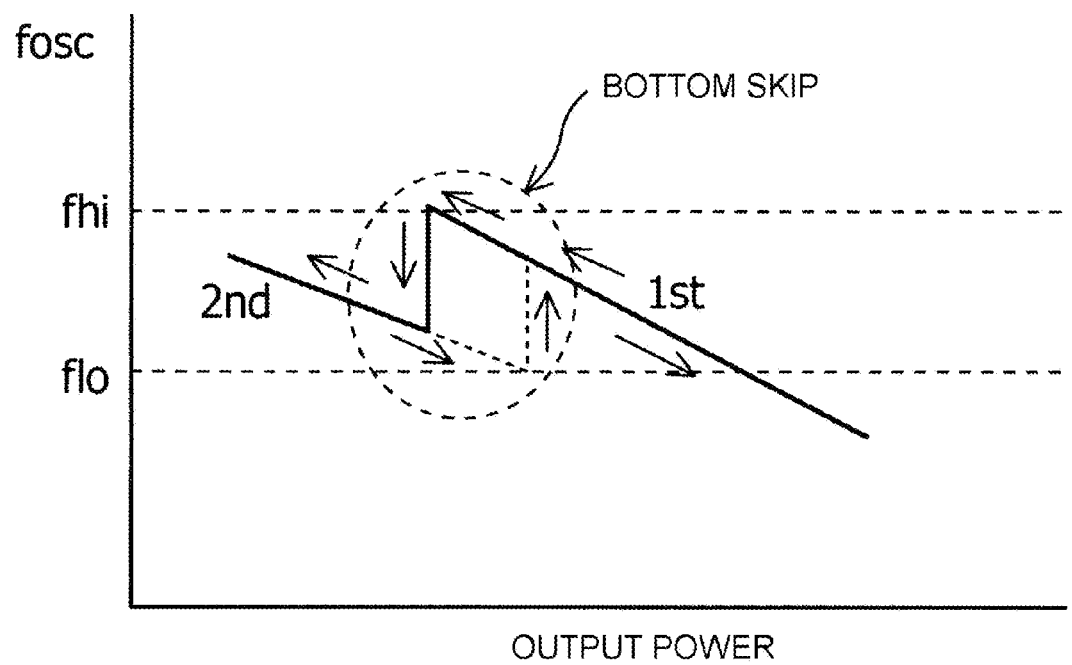
FIG. 12 is a graph showing a bottom skip operation incorporating a hysteresis between the upper and the lower limits of switching frequencies.

FIG. 11 shows an example of a quasi-resonant switching power supply according to another embodiment of the invention. In the embodiment described above, the dummy signal is used under a light load condition after the bottom detection has become unable. In contrast, the power supply device of the embodiment of FIG. 11 sets the bottom detection times to a number of times, for example seven times, in which the bottom detection is expected to be done without failure. When a number of bottoms more than this time is set, the dummy signal is forcedly used to reduce the frequency in the operation under a light load condition.

The quasi-resonant switching power supply of the embodiment of FIG. 11 comprises switching elements 49 and 51 in place of the OR circuit 39 shown in FIG. 3. The switching element 49 that operates in negative logic is in an ON state when the data signal Dm delivered from the Q4 terminal of the up/down counter 33 is at an L level, which means that the number of bottom skips is set to seven or less in the up/down counter 33. The switching element 49 delivers a Bot_in signal at an H level to the counter 41 and the AND circuit 47.

The switching element 51 that operates in positive logic is in an ON state when the data signal Dm delivered from the Q4 terminal of the up/down counter 33 is at an H level, which means that the number of bottom skips is set to eight or more in the up/down counter 33. The switching element 51 delivers a dummy signal at an H level to the counter 41 and the AND circuit 47.

In place of the data signal Dm delivered from the Q4 terminal of the up/down counter 33, the signal, a decoded signal in actual, from the output terminal of the counter 41 can be given to the control terminals of the switching elements 49 and 51 so that the Bot_in signals at an H signal are counted up to a predetermined number, and the dummy signals are counted thereafter. If the circuit connection is so constructed that the signal from the output terminal Q4 of the counter 41, for example, is given to the control terminals of the switching elements 49 and 51, the Bot_in signals at an H level are counted up to seven and after that the dummy signals are counted.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2012-157564 filed on Jul. 13, 2012, contents of which are incorporated herein by reference.

What is claimed is:

1. A control circuit of a quasi-resonant switching power supply, the control circuit
   comprising a bottom detecting circuit for detecting a bottom of a resonant waveform and delivering a bottom detection signal and
   counting a number of the bottoms detected by the bottom detecting circuit to determine a switching period under a light load condition,
wherein the control circuit counts a dummy signal in place of the bottom detection signal
   when the bottom detecting circuit becomes unable to detect a bottom,
   when a number of bottoms to be counted is a predetermined number, or when the number of bottoms detected by the bottom detecting circuit has reached a predetermined number.

2. A control circuit of a quasi-resonant switching power supply,
   the control circuit comprising:
      a bottom detecting circuit for detecting a bottom of a resonant waveform and delivering a bottom detection signal;
      a first counter for setting a number of bottom skips;
      a second counter for counting a number of bottoms; and
      a comparator for comparing a counted number of the first counter and a counted number of the second counter and for delivering a coincidence signal when the two counted numbers coincide with each other; and
   the control circuit performing switching operation of a switching element based on the bottom detection signal after the comparator has delivered the coincidence signal; wherein
      the control circuit comprises a dummy signal generating circuit for generating a dummy signal for replacing the bottom detection signal, and when the bottom detecting circuit becomes unable to detect a bottom due to damping of the resonant waveform, the second counter counts the dummy signal.

3. A control circuit of a quasi-resonant switching power supply,
   the control circuit comprising:
      a bottom detecting circuit for detecting a bottom of a resonant waveform and delivering a bottom detection signal;
      a first counter for setting a number of bottom skips;
      a second counter for counting a number of bottoms; and
      a comparator for comparing a counted number of the first counter and a counted number of the second counter and for delivering a coincidence signal when the two counted numbers coincide with each other; and
   the control circuit performing switching operation of a switching element based on the bottom detection signal after the comparator has delivered the coincidence signal; wherein
      the control circuit comprises a dummy signal generating circuit for generating a dummy signal for replacing the bottom detection signal, and when a setting value in the first counter exceeds a predetermined value or a number of bottoms in the resonant waveform exceeds a preset number of times, the second counter counts the dummy signal.

4. The control circuit of a quasi-resonant switching power supply according to claim 2, wherein the first counter is composed of an up/down counter, and the control circuit further comprises a timer for generating a first reference time and a timer for generating a second reference time longer than the first reference time, and when the switching period is shorter than the first reference time, the first counter executes up-counting, and when the switching period is longer than the second reference time, the first counter executes down-counting.

5. The control circuit of a quasi-resonant switching power supply according to claim 3, wherein the first counter is composed of an up/down counter, and the control circuit further comprises a timer for generating a first reference time and a timer for generating a second reference time longer than the first reference time, and when the switching period is shorter than the first reference time, the first counter executes up-counting, and when the switching period is longer than the second reference time, the first counter executes down-counting.

6. The control circuit of a quasi-resonant switching power supply according to claim 1, wherein a period of the dummy signal is set longer than a period of the resonant waveform.

7. The control circuit of a quasi-resonant switching power supply according to claim 2, wherein a period of the dummy signal is set longer than a period of the resonant waveform.

8. The control circuit of a quasi-resonant switching power supply according to claim 3, wherein a period of the dummy signal is set longer than a period of the resonant waveform.

9. The control circuit of a quasi-resonant switching power supply according to claim 4, wherein a period of the dummy signal is set longer than a period of the resonant waveform.

10. The control circuit of a quasi-resonant switching power supply according to claim 4, wherein the timer for generating the second reference time varies a period of time from an end of the first reference time until an end of the second reference time according to a signal delivered from the first counter or a signal indicating use of the dummy signal.

11. The control circuit of a quasi-resonant switching power supply according to claim 5, wherein the timer for generating the second reference time varies a period of time from an end of the first reference time until an end of the second reference time according to a signal delivered from the first counter or a signal indicating use of the dummy signal.

* * * * *